(12) United States Patent
Karnik et al.

(10) Patent No.: US 10,848,329 B2
(45) Date of Patent: Nov. 24, 2020

(54) POWER OVER ETHERNET DEVICE LEVEL RING BRIDGE

(71) Applicant: Endress+Hauser SE+Co. KG, Maulburg (DE)

(72) Inventors: Gautham Karnik, Whitestown, IN (US); Matthew Krygier, Noblesville, IN (US)

(73) Assignee: Endress+Hauser SE+Co. KG, Maulburg (DE)

( * ) Notice: Subject to any disclaimer, the term of this patent is extended or adjusted under 35 U.S.C. 154(b) by 248 days.

(21) Appl. No.: 16/106,150

(22) Filed: Aug. 21, 2018

(65) Prior Publication Data
US 2020/0067718 A1 Feb. 27, 2020

(51) Int. Cl.
| | |
|---|---|
| *H04L 12/10* | (2006.01) |
| *H04L 12/931* | (2013.01) |
| *H04L 12/24* | (2006.01) |
| *H04L 12/935* | (2013.01) |
| *H04L 12/42* | (2006.01) |

(52) U.S. Cl.
CPC .............. *H04L 12/10* (2013.01); *H04L 12/42* (2013.01); *H04L 41/0677* (2013.01); *H04L 49/30* (2013.01); *H04L 49/351* (2013.01); *H04L 49/405* (2013.01)

(58) Field of Classification Search
CPC ... H04L 12/42; H04L 12/10; H04L 2012/421; G06F 1/266
See application file for complete search history.

(56) References Cited

U.S. PATENT DOCUMENTS

| | | | | |
|---|---|---|---|---|
| 2006/0100799 | A1* | 5/2006 | Karam ................... | H04L 12/10 702/57 |
| 2006/0262727 | A1* | 11/2006 | Caveney ................ | H04B 3/548 370/242 |
| 2006/0273661 | A1* | 12/2006 | Toebes ................... | G06F 1/266 307/106 |
| 2008/0168283 | A1* | 7/2008 | Penning ................. | G06F 1/263 713/310 |
| 2010/0231054 | A1* | 9/2010 | Togawa .................. | H04B 3/44 307/112 |
| 2015/0127957 | A1* | 5/2015 | Sethi ....................... | G06F 1/26 713/300 |
| 2018/0167223 | A1* | 6/2018 | Pratap .................... | G06F 1/266 |

FOREIGN PATENT DOCUMENTS

EP 2202914 A1 * 6/2010 ........... H04L 12/413

OTHER PUBLICATIONS

Author Unknown, Consolidated Platform Configuration Guide, Cisco IOS Release 15.2(5)E, pp. 1-2058, Mar. 3, 2017 (Year: 2017).*

* cited by examiner

*Primary Examiner* — Christopher M Crutchfield
(74) *Attorney, Agent, or Firm* — Mark A. Logan; Endress+Hauser (USA) Holding, Inc.

(57) ABSTRACT

The present disclosure discloses a hybrid Power over Ethernet/Device Level Ring network in which power is delivered to connected devices on the same cable in which data are delivered, and the devices are configured to connect to the network in a daisy-chain fashion. The network of the disclosure may be configured to operate as a token ring. According to a further aspect of the present disclosure, a hybrid PoE/DLR network switch and a hybrid PoE/DLR network device for such a PoE/DLR hybrid network are disclosed.

14 Claims, 7 Drawing Sheets

POWER OVER ETHERNET DEVICE LEVEL RING BRIDGE

TECHNICAL FIELD

The present disclosure relates generally to Power over Ethernet and Device Level Ring networks.

BACKGROUND OF THE INVENTION

Figure 1:
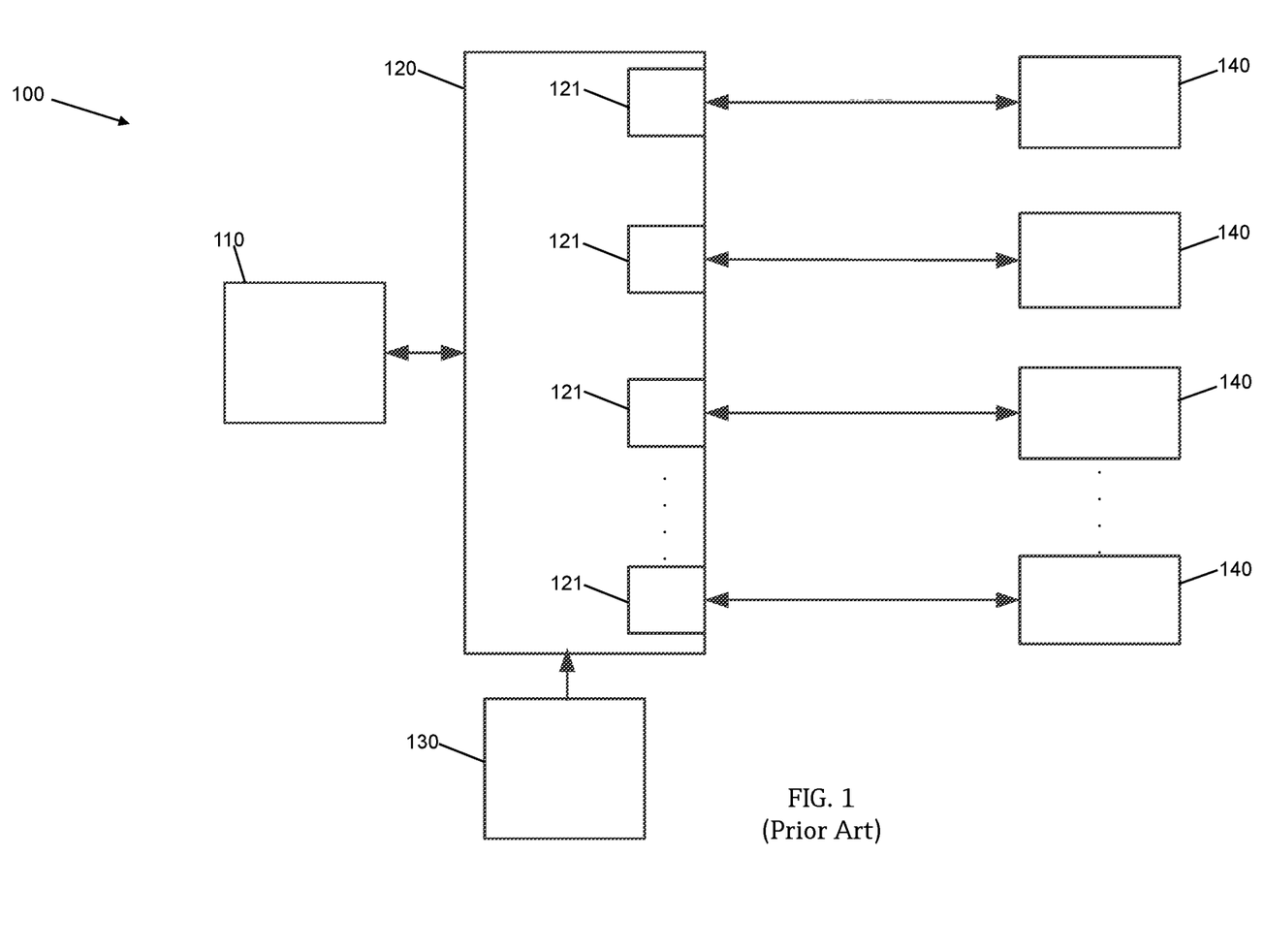
FIG. 1 shows a schematic of an exemplary Power over Ethernet (PoE) network according to the current state of the art.

A Power over Ethernet (PoE) network is an Ethernet communication network in which an Ethernet switch supplies both data and power to connected devices. Such a PoE network is shown in FIG. 1. The PoE network 100 includes a PoE Ethernet switch 120, one or more connected devices 140, and a process controller 110 to manage the PoE network 100. A power supply 130 supplies electrical energy to the Ethernet switch 120. Conventionally, each connected device 140 is connected directly to a port 121 on the PoE Ethernet switch 120 and receives its power to operate from the PoE Ethernet switch 120 through the port 121. The connected devices 140 do not require a separate connection to a power source.

A PoE Ethernet switch that supplies power to connected devices also may be called a PoE Power Supply Equipment (PSE). The connected devices that receive their operating power, as well as data, from the PSE are usually called Powered Devices (PD).

The PoE standard IEEE 802.3-2005 defines three power classes for PoE powered devices. Each class defines the maximum amount of electrical power and current that a powered device will draw from the PSE. For example, a powered device in class 2 may draw up to 6.49 W when connected with the PSE. A default class of 0 is also provided in which the power level of the powered device is not classified.

The following table lists the PoE power classes and the class resistance, the classification current, and the maximum power for each PoE class according to the IEEE 802.3-2005 standard.

TABLE 1

PoE Classes

| PoE Class | Class Resistance | Classification Current | Maximum Power |
|---|---|---|---|
| 0 | Open | <0.4 mA | 13 W |
| 1 | 140 Ω | 10.5 mA | 3.84 W |
| 2 | 76.8 Ω | 18.5 mA | 6.49 W |
| 3 | 49.9 Ω | 28 mA | 13 W |

When the PoE Ethernet switch 120, a PSE, initializes its connection with a connected device 140, the PoE Ethernet switch 120 measures a resistance across input pins of the connected device 140. This resistance is a specific value that corresponds to a PoE power class. For example, a resistance of 76.8Ω corresponds to power class 2. After the PoE Ethernet switch 120 determines the resistance of the connected device 140 and thus the connected device's PoE power class, the PoE Ethernet switch 120 will supply power to the connected device 140 up to the limits specified by the PoE power class, which is 6.49 W for the given example of power class 2.

Figure 2:
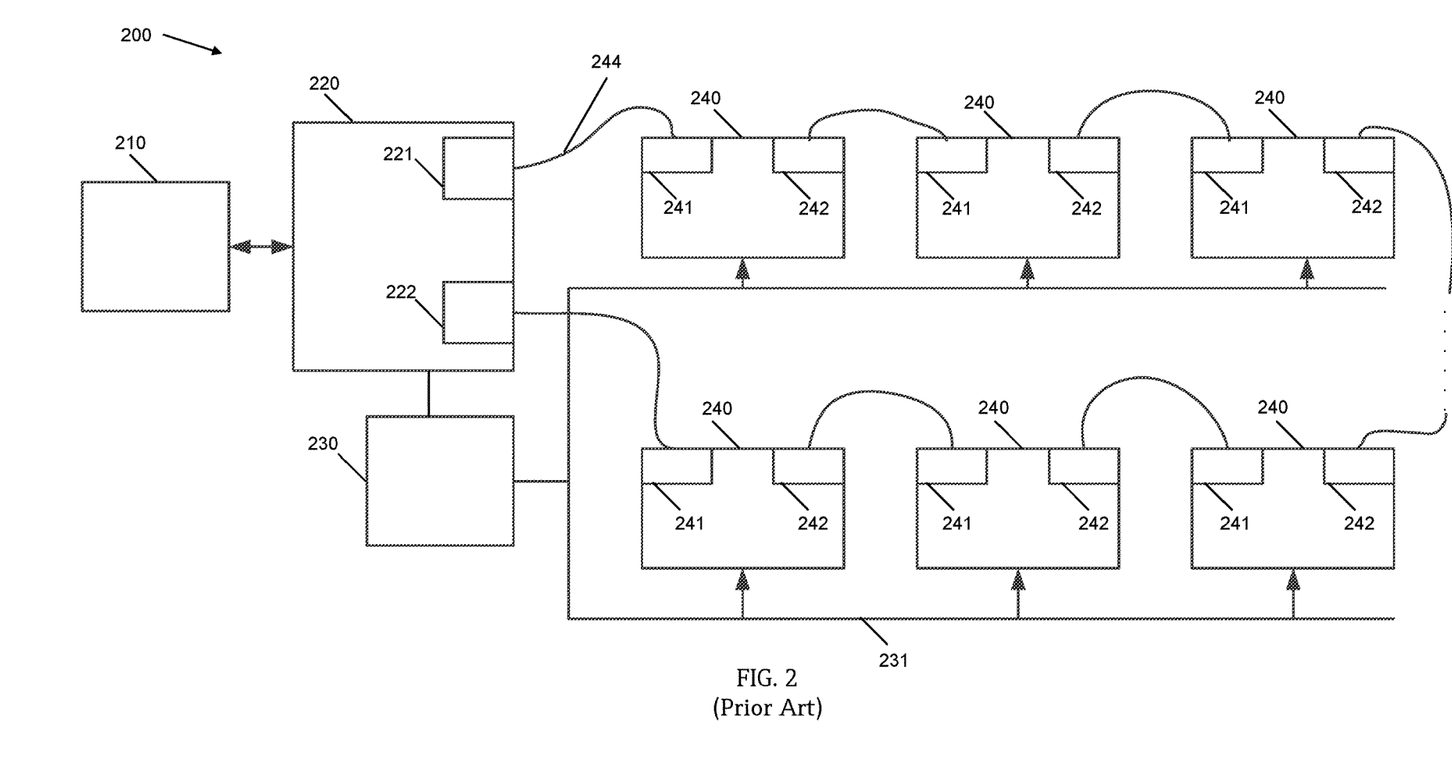
FIG. 2 shows a schematic of an exemplary Device Level Ring (DLR) network according to the current state of the art.

A Device Level Ring (DLR) network is an Ethernet communication network in which devices are connected to an Ethernet switch in a daisy chain. A conventional DLR network is shown in FIG. 2. The DLR network 200 includes an Ethernet switch 220, one or more connected devices 240, and a process controller 210 to manage the DLR network 200. Each connected device 240 also includes a separate connection to a power rail 231 from a power source 230.

The Ethernet switch 220 includes at least two Ethernet ports 221, 222, and the connected devices 240 each include at least two Ethernet ports 241, 242. A daisy chain of connections 244 is formed by connecting a first port 241 of a first connected device 240 to the first port 221 of the Ethernet switch 200. The first port 241 of the second connected device 240 is connected to the second port 242 of the first connected device 240. This daisy chain of connections 244 continues to the last connected device 240 in the chain, which is connected to the second port 222 of the Ethernet switch 220, thereby forming a ring connection. The daisy-chain connection scheme allows a simpler cabling than if each connected device 240 were connected directly to the Ethernet switch 220 and not to the previous connected device 240 in the chain.

The process controller 210 operates the daisy chain network in a token ring fashion. The passing of the token from the first port 221 of the Ethernet switch 220, through each connected device 240, and back to the second port 222 of the Ethernet switch 220 allows the process controller 210 to detect network and device failures. When the process controller 210 detects a network or device failure, the process controller 210 can communicate with connected devices 240 on the other side of the failure by communicating via the second port 222 of the Ethernet switch 220.

A PoE network is advantageous because power and data are provided on the same cable to powered devices, and the powered devices do not need a separate connection to a power source. However, each powered device in the PoE network must be connected to the PSE. A DLR network is advantageous because a connected device need be connected only to a previous device in the daisy chain and not directly to the Ethernet switch. The token ring operation of the DLR network further provides detection of network and device failures. However, each device in the DLR network requires a connection to a power source. Accordingly, there remains a need for further contributions in this area of technology.

SUMMARY OF THE INVENTION

According to at least one aspect of the present disclosure, to solve these problems with the current state of the art, the present disclosure discloses a hybrid PoE/DLR Ethernet network in which power is delivered to connected devices on the same cable in which data are delivered, and the devices are configured to connect to the network in a daisy-chain fashion. The network of the disclosure may be configured to operate as a token ring. According to a further aspect of the present disclosure, a hybrid PoE/DLR network switch and a hybrid PoE/DLR network device for such a PoE/DLR hybrid network are disclosed.

A network bridge according to the present disclosures includes a primary upstream Power over Ethernet (PoE) port embodied to transmit and receive data and to receive electrical energy; a secondary upstream PoE port embodied to transmit and receive data and to receive electrical energy; a primary downstream port embodied to transmit and receive data via Ethernet and to transmit electrical energy; a secondary downstream port embodied to transmit and receive data via Ethernet and to transmit electrical energy; a power supply circuit connected to the primary upstream PoE port and to the secondary upstream PoE port and configured to receive electrical energy from the primary upstream PoE port and the secondary upstream PoE port and to distribute the received electrical energy to the network bridge, the primary downstream port, and the secondary downstream port; a switchable resistor bank connected to the power supply circuit, wherein the switchable resistor bank includes a plurality of discrete resistance values, wherein each discrete resistance value corresponds to a PoE power class; an Ethernet switch circuit connected to the primary upstream PoE port, the secondary upstream PoE port, the primary downstream port, and the secondary downstream port and configured to route Ethernet data between the primary upstream PoE port and the primary downstream port and to route Ethernet data between the secondary upstream PoE port and the secondary downstream port; a switch control logic configured to switch the switchable resistor bank among the plurality of discrete resistance values; and an electronic control circuit including a microcontroller and a memory, wherein the electronic control circuit is configured to: configure the Ethernet switch; accept a total power output data value, wherein the total power output data value specifies the amount of electrical energy to be output by the primary downstream port and the secondary downstream port; and control the power supply circuit to distribute the total power output value of electrical energy to the primary downstream port and the secondary downstream port.

In certain embodiments of the network bridge, the switch control logic includes at least one DIP switch, wherein a state of the at least one DIP switch selects a resistor among the plurality of discrete resistance values, and wherein the selected resistor corresponds to a PoE power class, the electronic control circuit further configured to: determine a selected PoE power class by determining the value of the selected resistor; determine the total power output data value based on the selected PoE power class; and configure the power supply circuit to distribute the received electrical energy to the primary downstream port and to the secondary downstream port up to the total power output data value.

Certain embodiments of the network bridge further include a data port through which the electronic control circuit, including the microcontroller and the memory, may be programmed, wherein the electronic control circuit is further configured to: receive a programming via the data port; receive the total power output data value via the programming; select a resistor among the plurality of discrete resistance values, wherein the selected resistor corresponds to a PoE power class; determine the total power output data value based on the selected PoE power class; and configure the power supply circuit to distribute the received electrical energy to the primary downstream port and to the secondary downstream port up to the total power output data value.

Certain embodiments of the network bridge further include a power input connection, wherein the power supply circuit is further configured to receive electrical energy via the power input connection and to distribute the energy received via the power input connection to the network bridge and to the primary downstream port and the secondary downstream port.

Certain embodiments of the network bridge further include a first downstream power supply circuit connected between the power supply circuit and the primary downstream port and configured to condition and to supply electrical energy from the power supply circuit to the primary downstream port; and a second downstream power supply circuit connected between the power supply circuit and the secondary downstream port and configured to condition and to supply electrical energy from the power supply circuit to the secondary downstream port.

A network system according to the present disclosure includes a process controller; an Ethernet switch having a first port and a second port; a network bridge, including: a primary upstream PoE port embodied to transmit and receive data and to receive electrical energy, wherein the primary upstream PoE port is connected with the first port of the Ethernet switch; a secondary upstream PoE port embodied to transmit and receive data and to receive electrical energy, wherein the secondary upstream PoE port is connected with the second port of the Ethernet switch; a primary downstream port embodied to transmit and receive data via Ethernet and to transmit electrical energy; a secondary downstream port embodied to transmit and receive data via Ethernet and to transmit electrical energy; a power supply circuit connected to the primary upstream PoE port and to the secondary upstream PoE port and configured to receive electrical energy from the primary upstream PoE port and the secondary upstream PoE port and to distribute the received electrical energy to the network bridge, the primary downstream port, and the secondary downstream port; a switchable resistor bank connected to the power supply circuit, wherein the switchable resistor bank includes a plurality of discrete resistance values, wherein each discrete resistance value corresponds to a PoE power class; an Ethernet switch circuit connected to the primary upstream PoE port, the secondary upstream PoE port, the primary downstream port, and the secondary downstream port and configured to route Ethernet data between the primary upstream PoE port and the primary downstream port and to route Ethernet data between the secondary upstream PoE port and the secondary downstream port; a switch control logic configured to switch the switchable resistor bank among the plurality of discrete resistance values; and an electronic control circuit including a microcontroller and a memory, wherein the electronic control circuit is configured to: configure the Ethernet switch circuit: accept a total power output data value, wherein the total power output data value specifies the amount of electrical energy to be output by the primary downstream port and the secondary downstream port: and control the power supply circuit to distribute the total power output value of electrical energy to the primary downstream port and the secondary downstream port; and a first field device including: a first port embodied to transmit and receive data via Ethernet and to transmit and receive electrical energy; a second port embodied to transmit and receive data via Ethernet and to transmit and receive electrical energy; a field device power supply circuit connected to the first port and the second port and configured to receive electrical energy from the first port and to distribute the received electrical energy to the field device and to the second port; an Ethernet switch circuit connected to the first port and the second port and configured to route Ethernet data between the first port and the second port and further configured to route Ethernet data to the field device: and a field device electronics including a microcontroller and a memory, wherein the field device electronics are configured to configure the field device Ethernet switch circuit and to control the field device power supply circuit, wherein the first field device and the network bridge are connected to each other for the transfer of Ethernet data and electrical energy by connecting the first port of the first field device with the primary downstream port of the network bridge and by connecting the second port of the first field device with the secondary downstream port of the network bridge.

In certain embodiments of the network system, the Ethernet switch is a PoE Ethernet switch, and wherein the PoE Ethernet switch is configured to supply electrical energy to the primary upstream PoE port and the secondary upstream PoE port.

In certain embodiments of the network system, the network bridge further includes a power input connection, wherein the power supply circuit is further configured to receive electrical energy via the power input connection.

In certain embodiments of the network system, the field device power supply circuit is further configured to receive electrical energy from the second port and to distribute the received electrical energy to the field device and to the first port.

In certain embodiments of the network system, the field device further includes an external power connection, and wherein the field device power supply circuit is further configured to receive electrical energy via the external power connection.

In certain embodiments, the network system further includes a second field device, wherein the second port of the first field device is disconnected from the secondary downstream port and connected with the first port of the second field device, and the second port of the second field device is connected with the secondary downstream port, and wherein the electrical energy is transferred from the primary downstream port to the first port of the first field device and from the second port of the first field device to the first port of the second field device.

A method of operating a network bridge according to the present disclosure includes providing a PoE power supply equipment (PSE); providing a network bridge, including: a primary upstream PoE port embodied to transmit and receive data and to receive electrical energy; a secondary upstream PoE port embodied to transmit and receive data and to receive electrical energy; a primary downstream port embodied to transmit and receive data via Ethernet and to output electrical energy; a secondary downstream port embodied to transmit and receive data via Ethernet and to output electrical energy; and a switchable resistor bank including a plurality of discrete resistance values, wherein each discrete resistance value corresponds to a PoE power class, wherein the primary upstream port and the secondary upstream port of the network bridge are electrically connected to the PSE; providing a first field device, the first field device including: a first port embodied to transmit and receive data via Ethernet and to transmit and receive electrical energy; and a second port embodied to transmit and receive data via Ethernet and to transmit and receive electrical energy, wherein the first port of the first field device is connected to the primary downstream port of the network bridge; determining a total power requirement, wherein the total power requirement includes electrical power necessary to operate the network bridge and the first field device; determining a PoE power class having a power rating greater than the total power requirement; configuring the switchable resistor bank to a resistance value corresponding to the determined PoE power class; determining the PoE power class of the network bridge by the connected PSE measuring the resistance value of the switchable resistor bank; supplying electrical energy from the PSE to the network bridge according to the PoE power class; supplying electrical energy from the primary downstream port of the network bridge to the first port of the first field device; and communicating Ethernet data from the primary downstream port of the network bridge to the first port of the first field device.

Certain embodiments of the method of operating the network bridge further include providing a second field device wherein the first port of the second field device is connected to the second port of the first field device, and the second port of the second field device is connected to the secondary downstream port of the network bridge, thereby forming a daisy-chain network; supplying electrical energy from the second port of the first field device to the first port of the second field device; communicating the Ethernet data from the second port of the first field device to the first port of the second field device; and communicating the Ethernet data from second port of the second field device to the secondary downstream port of the network bridge, wherein the total power requirement further includes electrical power necessary to operate the second field device.

Certain embodiments of the method of operating the network bridge further include testing at the network bridge the Ethernet traffic at the primary downstream port and the secondary downstream port, wherein the testing is configured to detect a failure in the daisy-chain network; when the tested Ethernet traffic indicates a failure in the daisy-chain network, the method further comprises: communicating Ethernet data from the secondary downstream port of the network bridge to the second port of the second field device; and communicating the Ethernet data from the first port of the second field device to the second port of the first field device.

In certain embodiments of the method of operating the network bridge, upon a network or a device failure, the method further includes supplying electrical energy form the secondary downstream port of the network bridge to the second port of the second field device.

BRIEF DESCRIPTION OF THE DRAWINGS

The described embodiments and other features, advantages, and disclosures contained herein, and the manner of attaining them, will become apparent and the present disclosure will be better understood by reference to the following description of various embodiments of the present disclosure taken in conjunction with the accompanying drawings, wherein.

DETAILED DESCRIPTION

The present disclosure discloses devices for a hybrid PoE/DLR Ethernet network capable of receiving electrical energy and data on the same cable and capable of communicating in a daisy-chain token-ring network. The present disclosure further discloses a hybrid PoE/DLR network in which the daisy-chain connected devices receive their power to operate and data on the same cable, and in which communication proceeds in a token-ring manner. Various embodiments of the disclosed devices and network will now be presented in conjunction with the figures which illustrate the embodiments. It will be understood that no limitation of the scope of this disclosure is thereby intended.

Figure 3:
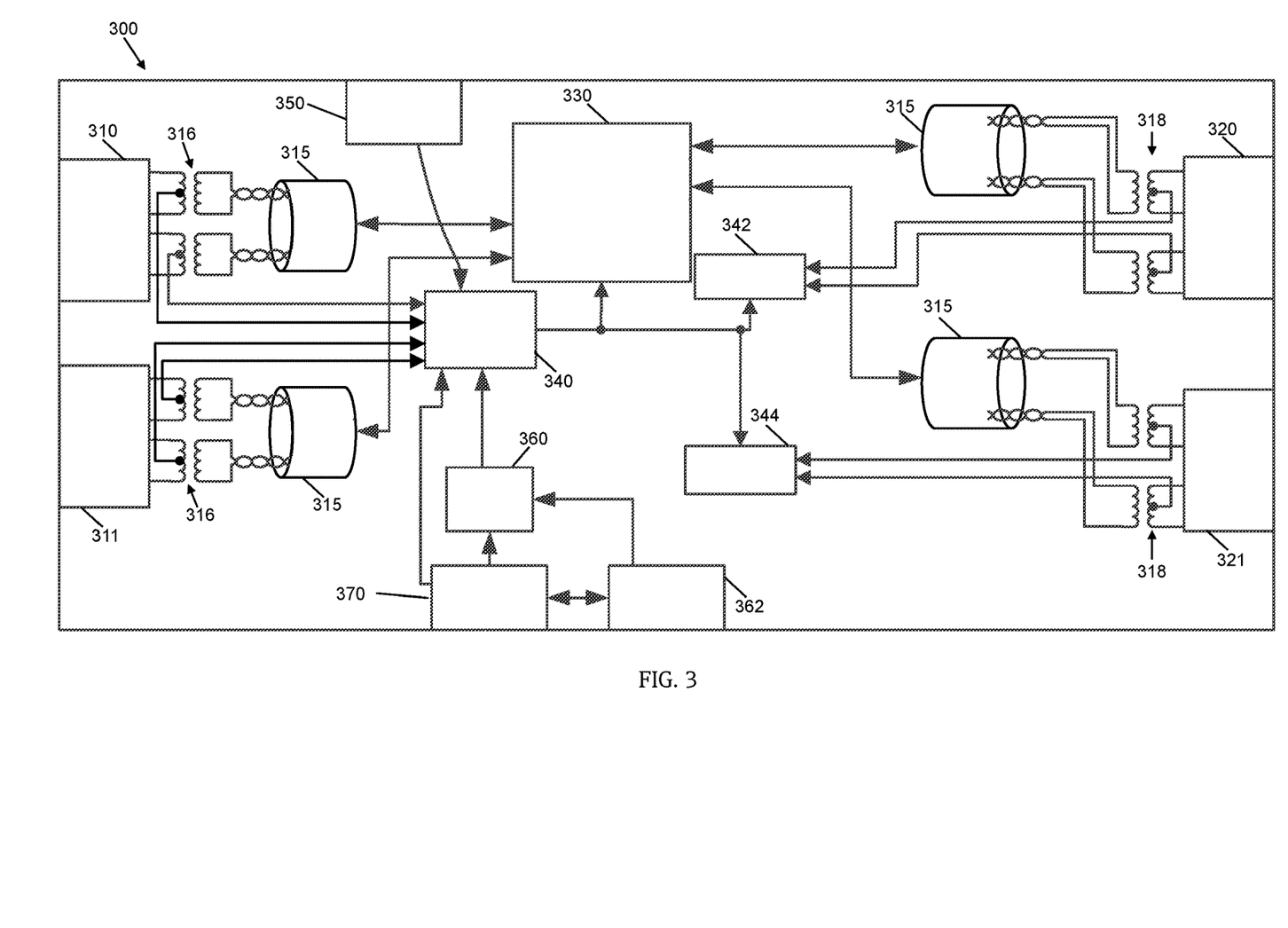
FIG. 3 shows a schematic of a hybrid PoE/DLR network according to an embodiment of the present disclosure.

FIG. 3 shows a PoE/DLR bridge 300 according to an embodiment of the present disclosure. The PoE/DLR bridge 300 may include a primary upstream port 310 and a secondary upstream port 311, and may further include a primary downstream port 320 and secondary downstream port 321. The PoE/DLR bridge 300 is configured to connect to a PoE power supply equipment; therefore, each upstream port 310, 311 is embodied according to a PoE standard to enable transfer of Ethernet data to and from the PoE/DLR bridge 300 and to receive electrical energy into the PoE/DLR bridge 300. Each downstream port 320, 321 is embodied to enable transfer of Ethernet data to and from the PoE/DLR bridge 300 and to transmit electrical energy from the PoE/DLR bridge 300.

The PoE/DLR bridge 300 may include a transformer 316 connected to the primary upstream port 310 and a separate transformer 316 connected to the secondary upstream port 311. Each transformer 316 may be connected to an Ethernet physical layer (PHY) circuit 315, as shown in FIG. 3. Each transformer 316 may be connected to its own PHY circuit 315, or each transformer may be connected to one PHY circuit 315 configured to accept two connections. Modulated data received on each upstream port 310, 311 is filtered by the transformers 316 and then conducted to the PHY circuits 315. The PHY circuits 315 demodulate the received data and transfer the demodulated data to an Ethernet switch 330 within the PoE/DLR bridge 300.

The PoE/DLR bridge 300 may include a transformer 318 connected to the primary downstream port 320 and a separate transformer 318 connected to the secondary downstream port 321. Each transformer 318 may be connected to an Ethernet PHY circuit 315. Modulated data received on each downstream port 320, 321 is filtered by the transformers 318 and then conducted to the PHY circuits 315 where the data are demodulated and transferred to the Ethernet switch 330.

Data may also be transferred from the Ethernet switch 330 to each of the upstream ports 310, 311 and to each of the downstream ports 320, 321. The data are transferred to one of the PHY circuits 315 that modulates the data and passes the data through one of the transformers 316, 318 for transmission out of the PoE/DLR bridge 300 via the respective port 310, 311, 320, 321.

Each transformer 316 is connected to a power supply circuit 340 within the PoE/DLR bridge 300. Each transformer 316 is embodied to separate a power signal from a data signal received on the upstream ports 310, 311, and to conduct electrical energy derived from the power signal to the power supply circuit 340. The power signal and the data signal may be received on the same conductor pairs at the upstream ports 310, 311, or the power signal and the data signal may be received on separate conductor pairs. The power supply circuit 340 conditions the electrical energy received through the upstream ports 310, 311 and distributes the electrical energy to various components within the PoE/DLR bridge 300, including to the transformer 318 connected to the primary downstream port 320 and to the transformer 318 connected to the secondary downstream port 321. Electrical energy distributed to the downstream ports 320, 321 may be used to energize a network device (not shown in FIG. 3) connected to the downstream port 320, 321.

In certain embodiments, the PoE/DLR bridge 300 may further include a first downstream power supply circuit 342 and a second downstream power supply circuit 344 connected between the power supply circuit 340 and the transformers 318. The downstream power supply circuits 342, 344 receive electrical energy from the power supply circuit 340 and further condition the electrical energy for transfer out of the PoE/DLR bridge 300 via the downstream ports 320, 321. The energy transferred out the downstream ports 320, 321 may be transferred on the same conductor pair on which data are transferred, or the power may be transferred on a separate conductor pair.

The upstream ports 310, 311 are embodied to receive a maximum electrical energy according to a PoE standard. In at least one embodiment, the upstream ports 310, 311 are embodied to receive a maximum electrical energy according to PoE class 3, which is up to 13 W. In such an embodiment, the downstream ports 320, 321 are embodied to transmit a maximum electrical energy sufficient to power a class 3 PoE device, which is up to 13 W.

In certain embodiments of the PoE/DLR bridge 300, the PoE/DLR bridge 300 may include a power input 350 embodied to connect to an external power supply (not shown in FIG. 3). In such embodiments, the power input 350 is connected to the power supply circuit 340 such that electrical energy received through the power input 350 may be supplied to the power supply circuit 340 and therefrom distributed to the various components of the PoE/DLR bridge 300, including the downstream ports 320, 321. In embodiments of the PoE/DLR bridge 300 that include the power input 350, the electrical energy received through the power input 350 may supplement the electrical energy received through the upstream ports 310, 311, or the electrical energy received through the power input 350 may be the only electrical energy powering the PoE/DLR bridge 300.

The Ethernet switch 330 may be configured to route data bi-directionally between the primary upstream port 310 and the primary downstream port 320 and to route data bi-directionally between the secondary upstream port 311 and the secondary downstream port 321. In operation of the PoE/DLR bridge 300, at least a portion of the Ethernet data will be passed between the primary upstream port 310 and the primary downstream port 320.

PoE/DLR bridge 300 may include a switchable resistor bank 360 connected to the primary upstream port 310 through the power supply circuit 340. The switchable resistor bank 360 includes a plurality of discrete resistance values from which one can be selected such that the electrical resistance across terminals of the switchable resistor bank 360 is that of a selected discrete resistance value. The switchable resistor bank 360 is connected to the primary upstream port 310 such that a PoE Power Supply Equipment (PSE) can connect to the primary upstream port 310 and measure a power class resistance, which is provided by the switchable resistor bank 360, present at the primary upstream port 310. The power class resistance indicates to the PoE PSE the power class of the PoE/DRL bridge 300 and thus how much electrical energy the PoE/DLR bridge 300 requires for operation.

Each of the discrete resistance values in the switchable resistor bank 360 may correspond to the defined PoE power classes. Therefore, the selection of a discrete resistance value in the switchable resistor bank 360 selects a PoE power class represented to the connected PoE PSE. In this way, by selecting a different discrete resistance value in the switchable resistor bank 360, the power class of the PoE/DLR bridge 300 manifested to the PoE PSE may be changed to match the power requirements of a current installation of the PoE/DLR bridge 300.

The PoE/DLR bridge 300 may include one or more DIP switches 362 connected to the switchable resistor bank 360 to effect the selection of the discrete resistance value from among the plurality of discrete resistance values in the switchable resistor bank 360.

The PoE/DLR bridge 300 may further include a microcontroller 370. The microcontroller 370 may be configured and programmed to control the various components of the PoE/DLR bridge 300 including the Ethernet switch 330. The microcontroller 370 may be further configured to control the switchable resistor bank 360 to effect the selection of the discrete resistance value from among the plurality of resistance values in the switchable resistor bank 360. In embodiments of the PoE/DLR bridge in which the microcontroller 370 is configured to control the switchable resistor bank 360, the one or more DIP switches 362 are not needed and therefore may not be included in such embodiments of the PoE/DLR bridge 300.

The embodiment of the PoE/DLR bridge 300 as shown in FIG. 3 allows one or more powered devices to be connected to either the primary downstream port 320 or the secondary downstream port 321 and to receive both Ethernet data and electrical energy from the PoE/DLR bridge 300 via the downstream ports 320, 321. If the one or more of the powered devices are connected together in a daisy chain, the first device of the daisy chain may be connected to the primary downstream port 320, and the last device of the daisy chain may be connected to the secondary downstream port 321.

Though the PoE/DLR bridge 300 may supply Ethernet data and electrical energy directly to the powered devices connected directly to the downstream ports 320, 321, when all the powered devices in the daisy chain are themselves configured to transmit Ethernet data and electrical energy along the cable that connects the powered devices to each other, each powered device in the daisy chain may receive both Ethernet data and electrical energy from the previous powered device in the daisy chain and may pass both Ethernet data and electrical energy to the next powered device in the daisy chain. With such a network of powered devices, the benefits of the PoE are extended beyond the first and last devices in the daisy-chain.

A separate network controller (not shown in FIG. 3) may operate the PoE/DLR bridge 300 and the connected powered devices in a token ring manner by passing Ethernet data through the PoE/DLR bridge 300 via the primary upstream port 310 and the primary downstream port 320. From the primary downstream port 320, the Ethernet data may be passed through each connected powered device in the daisy-chain network until the Ethernet data returns to the PoE/DLR bridge 300 at the secondary downstream port 321. Once received at the secondary downstream port 321, the Ethernet data may be analyzed by the network controller as a part of the network controller's management of a token-ring network.

Figure 4:
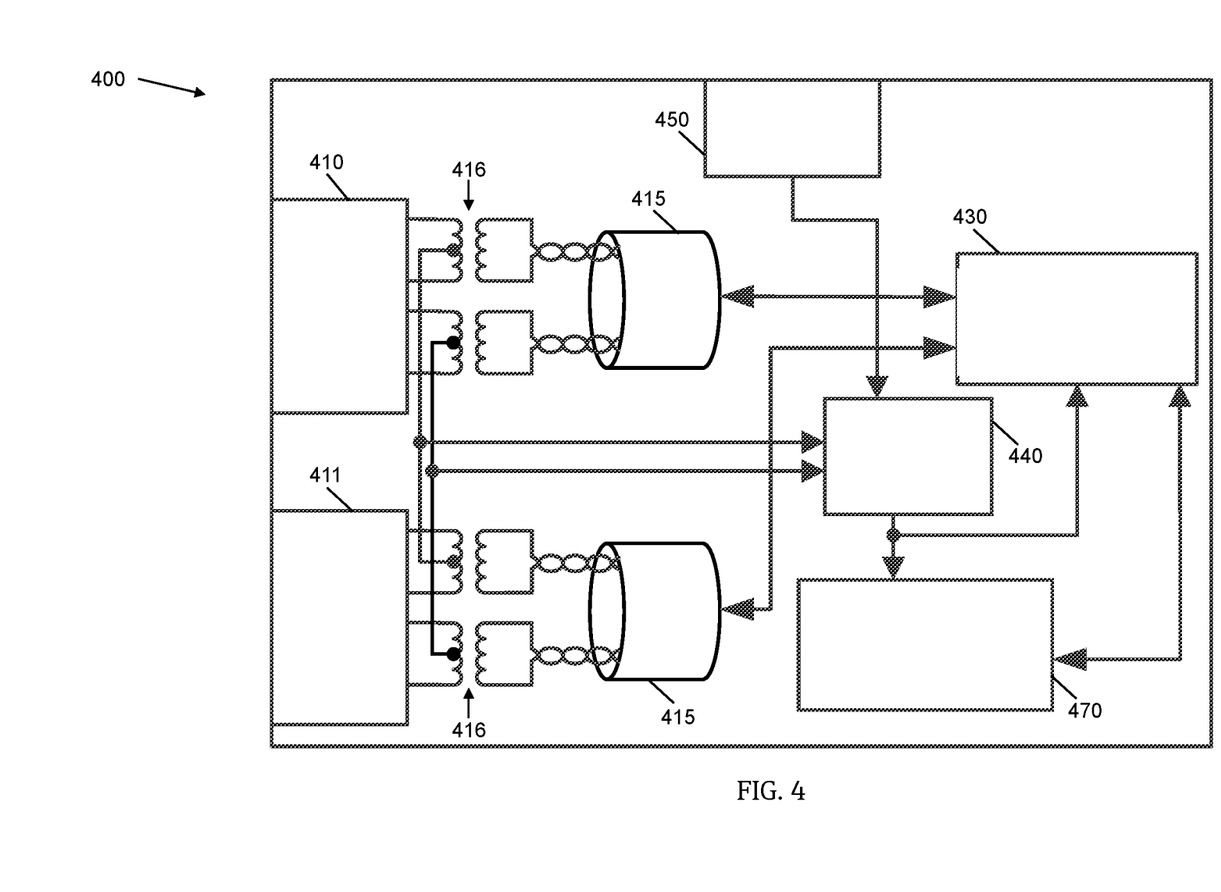
FIG. 4 shows a schematic of a hybrid PoE/DLR network according to an embodiment of the present disclosure.

FIG. 4 shows a PoE/DLR network device 400 according to an embodiment of the present disclosure. Such a PoE/DLR network device 400 may be embodied to connect to other PoE/DLR network devices 400 in a daisy-chain manner so that each PoE/DLR network device 400 in the daisy-chain may receive electrical energy and Ethernet data from a previous PoE/DLR network device 400 in the daisy-chain and may pass electrical energy and Ethernet data to a next PoE/DLR network device 400 in the chain. Thus, electrical energy and Ethernet data may be passed from device to device in the daisy-chain.

The PoE/DLR network device 400 may include a first port 410 and a second port 411. Each port 410, 411 is embodied to transfer Ethernet data to and from the network device 400, to receive electrical energy into the network device 400, and to transmit electrical energy from the network device 400. The electrical energy received through one of the ports 410, 411 may be sufficient to power the network device 400. Energy in excess of that energy required to operate the network device 400 may be transmitted out the other port 410, 411. In operation, electrical energy may be received by the network device 400 on only one of the ports 410, 411, and the excess electrical energy will be transmitted out the other port 410, 411. Such excess electrical energy may be used to power a network device 400 connected to the port 410, 411 via which the electrical energy is transmitted out, thus enabling a daisy-chain connection of network devices 400 in which each network device 400 receives data and energy from a previous network device 400 in the daisy chain.

The PoE/DLR network device 400 may include a transformer 416 connected to the first port 410 and a separate transformer 416 connected to the second port 411. Each transformer 416 may be connected to an Ethernet PHY circuit 415. Each transformer 416 may be connected to its own PHY circuit 415, as shown in FIG. 4, or each transformer 416 may be connected to one PHY circuit 415 that is embodied to accept two connections. Modulated data received on each port 410, 411 are filtered by the transformers 416 and then conducted to the PHY circuit 415. The PHY circuit 415 demodulates the received data and transfers the demodulated data to an Ethernet switch 430 within the network device 400.

Data may also be transferred from the Ethernet switch 430 to the PHY circuits 415 for transmission out either port 410, 411. Such data may include received Ethernet data not addressed to the network device 400, or such data may include data originating from the network device 400 and addressed to some other network device. The PHY circuits 415 modulate the data received from the Ethernet switch 430 and pass the data through the transformers 416 for transmission out the ports 410, 411.

The electrical energy received through a port 410, 411 and filtered by the transformer 416 may be conducted to a power supply circuit 440 within the network device 400. The power supply circuit 440 conditions the electrical energy and distributes the electrical energy to the various components within the network device 400. The power supply circuit 440 may be configured to distribute electrical energy received on the first port 410 to the second port 411 from which the energy may be transmitted to a connected network device 400. The power supply circuit 440 may also be configured to distribute electrical energy received on the second port 411 to the first port 410 from which the energy may be transmitted to a connected network device 400. The two transformers 416 are connected to the circuitry of the network work device 400 in a wire-OR manner such that if electrical energy is present on both ports 410, 411, electrical energy is received through only one of the ports 410, 411 and the electrical energy is not distributed to the other port 410, 411.

Some embodiments of the network device 400 may include a power input 450 enabling the connection of an external power supply (not shown in FIG. 4) to the power supply circuit 440. In such an embodiment, the electrical energy received through the power input 450 may supplement any power received through either port 410, 411, or the power received through the power input 450 may be the only electrical energy received to operate the network device 400. The power input 450 enables the network device 400 to operate in a DLR network in which electrical energy is not received on either port 410, 411.

The network device 400 may include a control electronics 470 configured to operate the network device 400. The network device 400 may include other functionality not shown in FIG. 4 that may include functionality specific to the application of the network device. For example, the network device 400 may include a pressure measuring cell or an ultrasonic transducer or a radar antenna or an actuator. That is, the network device 400 may be embodied as a field device in a process automation system. Therefore, the control electronics 470 may include the components necessary for the configuration and operation of the included functionality in the network device 400.

The network device 400 as shown in FIG. 4 and the PoE/DLR bridge 300 as shown in FIG. 3 may be incorporated together into a hybrid PoE/DLR network 500 in which one or more network devices 400 are connected together in a daisy chain. Since the ports 320, 321 of the PoE/DLR bridge 300 and the ports 410, 411 of the network devices 400 are each configured to transmit Ethernet data as well as electrical energy, a connection between two devices in the PoE/DLR network 500 requires only one cable. Thus, the hybrid PoE/DLR network 500 enables the simple cabling of a PoE network in which Ethernet data and electrical energy are transferred on one cable, and also enables the simple cabling of a DLR network in which a device is connected to a previous device in the daisy chain and to a next device in the daisy chain.

Figure 5:
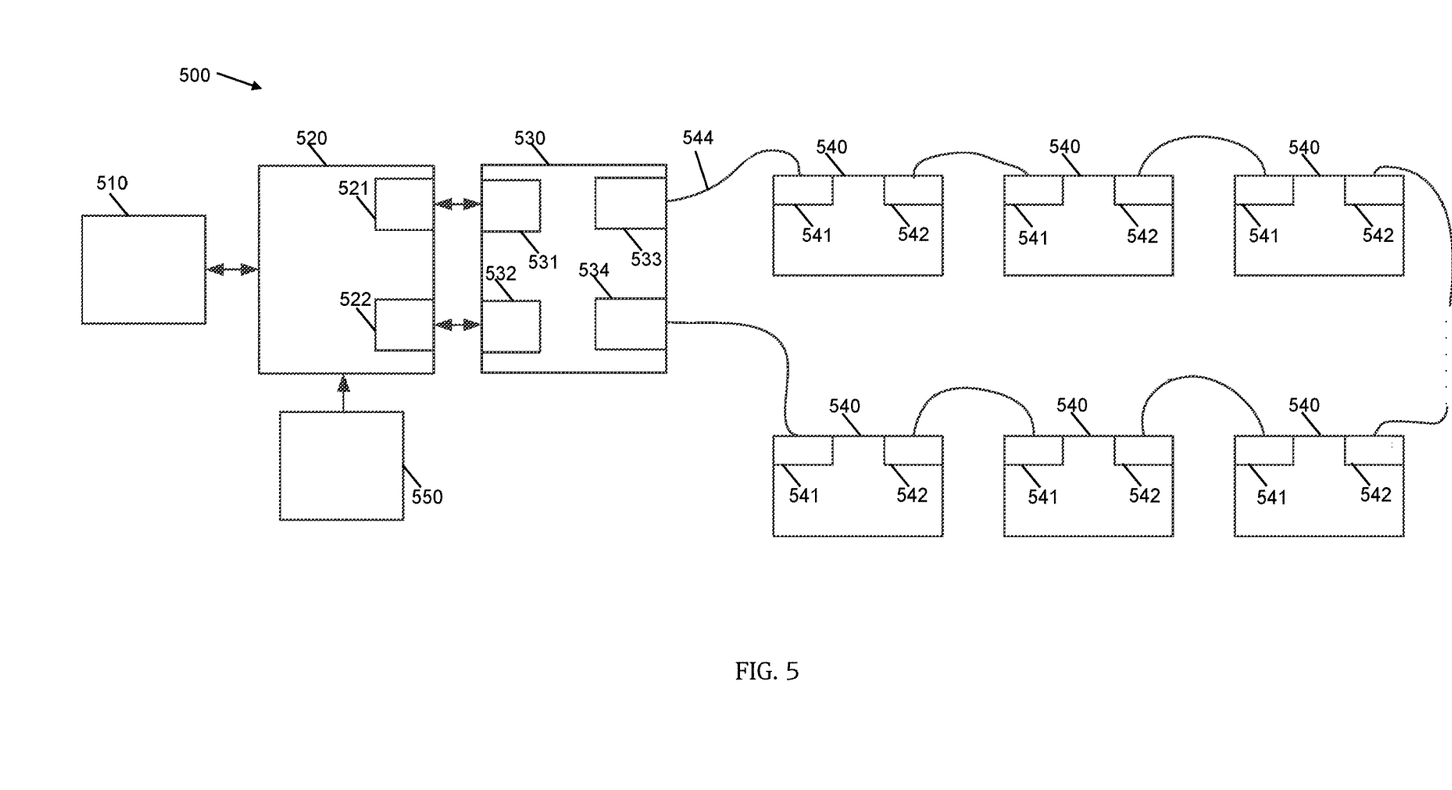
FIG. 5 shows a schematic of a hybrid PoE/DLR network bridge according to an embodiment of the present disclosure.

FIG. 5 shows an embodiment of the hybrid PoE/DLR network 500 including a PoE/DLR bridge 530 and network devices 540 according to the present disclosure. The hybrid PoE/DLR network 500 may include a process controller 510 and an Ethernet switch 520. The process controller 510 may be connected to the Ethernet switch 520 for the communication of Ethernet data and for the configuration and control of the Ethernet switch 520. The process controller 510 may be embodied to control the network devices 540. The Ethernet switch may have at least a primary port 521 and a secondary port 522. The Ethernet switch 520 may be a PoE Ethernet switch that supplies electrical energy out of the primary port 521 and the secondary port 522.

The hybrid PoE/DLR network 500 may include the PoE/DLR bridge 530 connected to the Ethernet switch 520. The PoE/DLR bridge 530 may include a primary upstream port 531 and a secondary upstream port 532. Both the primary upstream port 531 and the secondary upstream port 532 may be embodied to transfer Ethernet data to and from the PoE/DLR bridge 530 and to receive electrical energy sufficient to operate the PoE/DLR bridge 530. The primary upstream port 531 may be connected to the primary port 521 of the Ethernet switch 520, and the secondary upstream port 532 may be connected to the secondary port 522 of the Ethernet switch 520. The electrical energy to operate the PoE/DLR bridge 530 may be supplied completely by the Ethernet switch 520 via the ports 521, 522.

The hybrid PoE/DLR network 500 may include one or more network devices 540. Each network device 540 may have at least a first port 541 and a second port 542. The first port 541 of a first network device 540 may be connected to the primary downstream port 533 of the PoE/DLR bridge 530. When the hybrid PoE/DLR network 500 has only one network device 540, the second port 542 of the network device 540 is connected to the primary downstream port 534 of the PoE/DLR bridge 530. When the hybrid PoE/DLR network 500 has more than one network device 540, as shown in FIG. 5, the second port 542 of the first network device 540 may be connected to the first port 541 of a second network device 540, forming a daisy-chain connection 544. The last network device 540 in the daisy chain 544 may be connected from the second port 542 of the network device 540 to the secondary downstream port 534 of the PoE/DLR bridge 530.

The hybrid PoE/DLR network 500 may include a power supply 550 connected to the Ethernet switch 520. In such embodiments of the hybrid PoE/DLR network 500, the Ethernet switch 520 is a standard, off-the-shelf PoE Ethernet switch configured to supply electrical energy to the PoE/DLR bridge 530.

Because the network devices 540 in the daisy-chain connection 544 receive their Ethernet data and operating energy via the PoE/DLR bridge 530, the hybrid PoE/DLR network enables the use of the standard, off-the-shelf PoE Ethernet switch 520. Such is an advantage of the disclosed PoE/DLR bridge 530: already-existing PoE networks may be upgraded to make use of the disclosed PoE/DLR bridge 530 and network devices 540, yet continue to use the existing PoE switches and power supplies.

Figure 6:
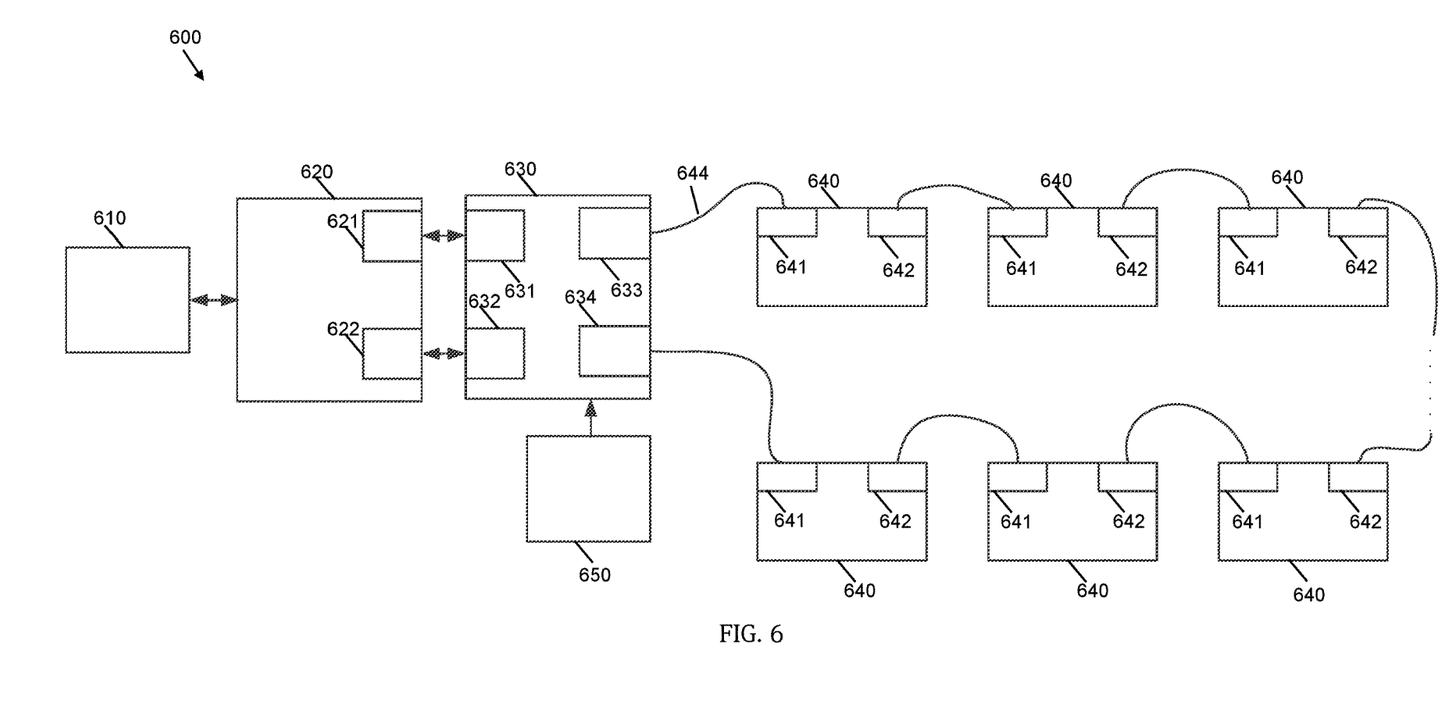
FIG. 6 shows a schematic of a hybrid PoE/DLR network device according to an embodiment of the present disclosure.

FIG. 6 shows an alternate embodiment of the hybrid PoE/DLR network 500. As shown in FIG. 6, a hybrid PoE/DLR network 600 includes a process controller 610, an Ethernet switch 620 including a primary port 621 and a secondary port 622, a PoE/DLR network bridge 630 including upstream ports 631, 632 and downstream ports 633, 644, a power supply 650 connected to the PoE/DLR network bridge 630, and one or more network devices 640 including ports 641, 642. The one or more network devices 640 may be connected together in a daisy chain 644. The Ethernet switch 620 does not supply electrical energy to the PoE/DLR bridge 630 via the ports 620, 621, and therefore the PoE/DLR bridge 630 includes a connection to a power supply 650. Such an embodiment of the PoE/DLR bridge 630 that is connected directly to the power supply 650 enables the hybrid PoE/DLR network 600 to use an Ethernet switch 620 that is not also a PSE.

The PoE/DLR bridge 530 and the network devices 540 of the hybrid PoE/DLR network as shown in FIG. 5 receive their operating power from the PoE Ethernet switch 520. The power supplied by the PoE/DLR bridge 530, and therefore the power consumed by the PoE/DLR bridge 530, may change as network devices 540 are added to or removed from the hybrid PoE/DLR network 500. For this reason, the power class of the PoE/DLR bridge 530 that is manifested to the PoE PSE may be changed to match the power requirements of the daisy-chain connection of network devices 540.

The power required by the PoE/DLR bridge 530 is the algebraic sum of the required power for each network device 540 in the daisy chain 544 and the required power for the PoE/DLR bridge 530 itself. The total of the required power may be used to determine a PoE power class that the PoE/DLR bridge 530 may manifest to the PoE Ethernet switch 520. For example, if the sum of the power requirements of the connected network devices 540 and the PoE/DLR bridge 530 is less than 3.5 W, the PoE power class of the PoE/DLR bridge 530 may be set to 1. The PoE power class of the PoE/DLR bridge 530 is set via the switchable resistor bank (see FIG. 3, switchable resistor bank 360) by selecting a value of 140Ω. After the setting of the PoE power class to 1, the PoE/DLR bridge 530 may then be powered by a PoE Ethernet switch 520 that supports PoE power class 1 and provides up to 3.84 W of electrical power.

The addition of network devices 540 to a daisy-chain network 544 may increase the power requirements of the PoE/DLR bridge 530. Therefore, the algebraic sum of the required power for the network devices 540 is recalculated and the PoE power class is re-determined with the recalculated sum. If the PoE power class changes due to the addition or the removal of a network device 540, the switchable resistor bank may be changed to manifest the changed PoE power class to the PoE Ethernet switch 520.

Figure 7:
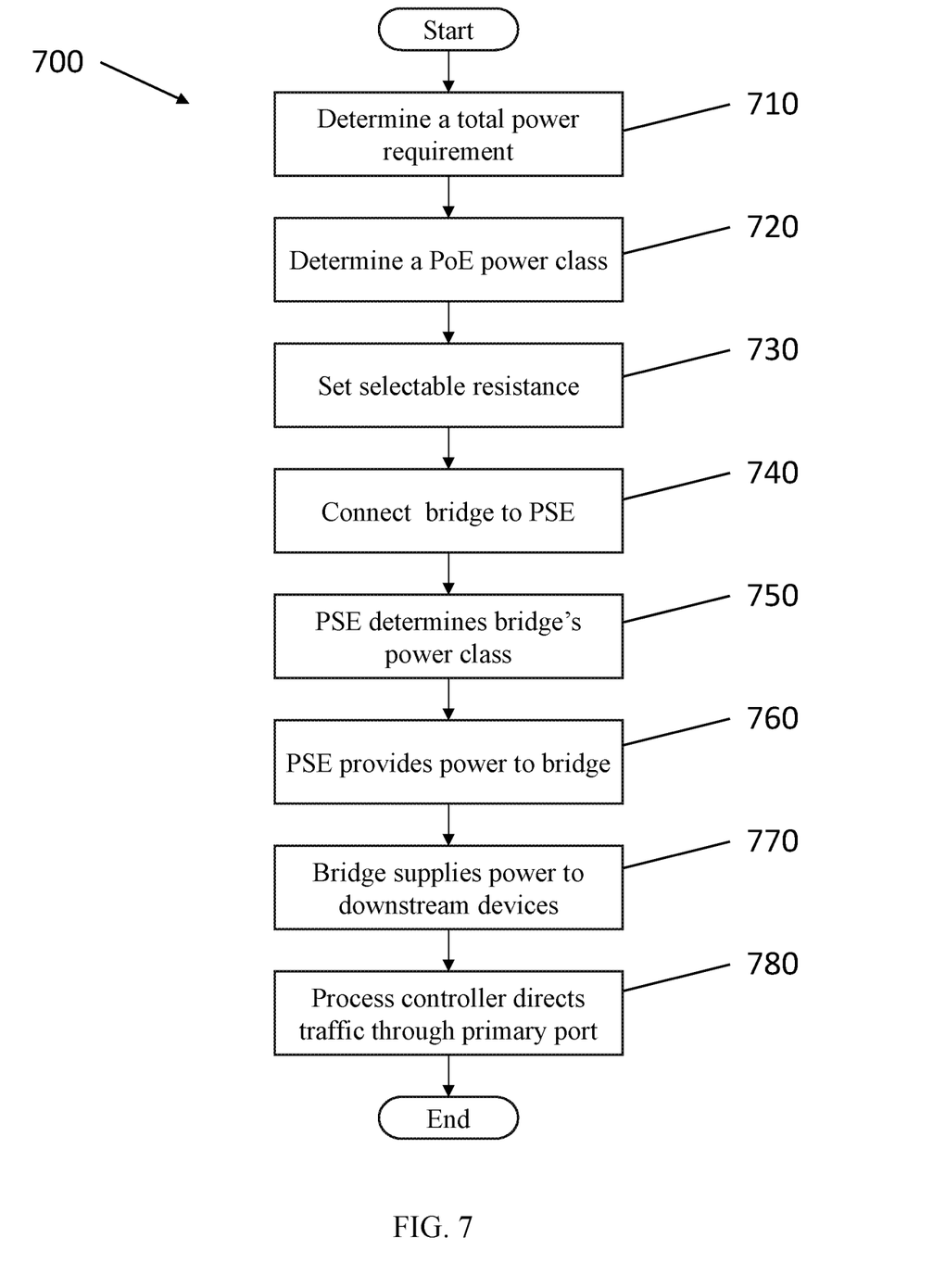
FIG. 7 shows a method of operating a PoE/DLR network bridge according to an embodiment of the present disclosure.

FIG. 7 shows an embodiment of a method 700 of operating a hybrid PoE/DLR network according to the present disclosure. The method 700 will be described with reference to the hybrid PoE/DLR network 500 as shown in FIG. 5, but the method 700 may be easily used or adapted for use with other configurations of a hybrid PoE/DLR network according to the present disclosure.

In an exemplary embodiment, the hybrid PoE/DLR network 500 as shown in FIG. 5 includes a PoE/DLR network bridge 530, a process controller 510, an Ethernet switch/PoE PSE 520, and one or more connected PoE/DLR network devices 540 that are connected in a daisy-chain manner to the PoE/DLR bridge 530.

The method 700 according to the present disclosure may include a step 710 of a determining a total power requirement of the network devices 540. The total power requirement is the algebraic sum of power requirements of all network devices to be powered by the PoE PSE 520, including the electrical power necessary to operate the PoE/DLR bridge 530 and all connected PoE/DLR network devices 540.

The method 700 may include a step 720 of selecting a PoE power class for the PoE/DLR bridge 530 based on the total power requirement. The PoE power class is selected such that the maximum power that can be supplied by the PoE PSE 520 in the selected PoE power class is greater than the total power requirement of the hybrid PoE/DLR network 500.

The method 700 may include a step 730 of setting a selectable resistance in the PoE/DLR network bridge 530 corresponding to the determined PoE power class. The selectable resistance is measurable by the PoE PSE 520 that connects to the PoE/DLR bridge 530. The selectable resistance may be set by DIP switches within the PoE/DLR bridge 530 or by a microcontroller within the PoE/DLR bridge 530.

The method 700 may include a step 740 of connecting the PoE/DLR bridge 530 to the PoE PSE 520. In this step 740, the upstream ports 531, 532 of the PoE/DLR bridge are connected to the ports 521, 522 of the PoE PSE 520 such that Ethernet data can be transferred between the PoE PSE 520 and the PoE/DLR bridge 530 and electrical energy can be transferred from the PoE PSE 520 to the PoE/DLR bridge 530.

The method 700 may include a step 750 of the PoE PSE 520 determining the PoE power class of the PoE/DLR bridge 530. The PoE power class is determined by the PoE PSE 520 measuring the resistance presented at the upstream port 310 of the PoE/DLR bridge 530, which is the selectable resistance selected in step 730. In the step 750, the PoE PSE 520 determines the maximum amount of electrical energy that the PoE PSE 520 will supply to the PoE/DLR bridge 530.

In a step 760 of the method 700, the PoE PSE 520 supplies electrical energy to the PoE/DLR bridge 530 according to the PoE power class determined in the step 750.

The method 700 may include a step 770 of the PoE/DLR bridge 530 supplying electrical energy to the connected PoE/DLR network devices 540. If there is more than one connected PoE/DLR network device 540 in the daisy chain 544, each PoE/DLR network device 540 may supply electrical energy to the next PoE/DLR network device 540 in the daisy chain 544.

The method 700 may include a step 780 of the process controller 510 operating the hybrid PoE/DLR network by controlling Ethernet traffic primarily through a primary port of the PoE/DLR network device.

The method 700 of operating a hybrid PoE/DLR network allows the power requirements of the network to be changed with the addition or removal of powered network devices. If, in an initial configuration, the power requirements of the PoE/DLR bridge and the power devices is minimal, a PoE class of 1 may be used for the PoE/DLR bridge. Thus, a PoE Ethernet switch or a PoE PSE may be used in the hybrid PoE/DLR network which has a capacity to supply power only for PoE class 1. However, if more powered devices are added to the network, the method 700 allows the power requirements and the PoE power class to be changed to a higher value. Such a change to a higher PoE power class may necessitate the replacement of the PoE Ethernet switch or PoE PSE, for example.

While various embodiments of a PoE/DLR hybrid network and devices have been described in considerable detail herein, the embodiments are merely offered by way of non-limiting examples of the disclosure described herein. It will therefore be understood that various changes and modifications may be made, and equivalents may be substituted for elements and steps thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Such sequences may be varied and still remain within the scope of the present disclosure. Therefore, the particular order of the steps disclosed herein should not be construed as limitations of the present disclosure.

What is claimed is:

1. A network bridge, comprising:
  a primary upstream Power over Ethernet (PoE) port embodied to transmit and receive data and to receive electrical energy;
  a secondary upstream PoE port embodied to transmit and receive data and to receive electrical energy;
  a primary downstream port embodied to transmit and receive data via Ethernet and to transmit electrical energy;
  a secondary downstream port embodied to transmit and receive data via Ethernet and to transmit electrical energy;
  a power supply circuit connected to the primary upstream PoE port and to the secondary upstream PoE port and configured to receive electrical energy from the primary upstream PoE port and the secondary upstream PoE port and to distribute the received electrical energy to the network bridge, the primary downstream port, and the secondary downstream port;
a first downstream power supply circuit connected between the power supply circuit and the primary downstream port and configured to condition and to supply electrical energy from the power supply circuit to the primary downstream port;
a second downstream power supply circuit connected between the power supply circuit and the secondary downstream port and configured to condition and to supply electrical energy from the power supply circuit to the secondary downstream port;
a switchable resistor bank connected to the power supply circuit, wherein the switchable resistor bank includes a plurality of discrete resistance values, wherein each discrete resistance value corresponds to a PoE power class;
an Ethernet switch circuit connected to the primary upstream PoE port, the secondary upstream PoE port, the primary downstream port, and the secondary downstream port and configured to route Ethernet data between the primary upstream PoE port and the primary downstream port and to route Ethernet data between the secondary upstream PoE port and the secondary downstream port;
a switch control logic configured to switch the switchable resistor bank among the plurality of discrete resistance values; and
an electronic control circuit including a microcontroller and a memory, wherein the electronic control circuit is configured to:
configure the Ethernet switch;
accept a total power output data value, wherein the total power output data value specifies the amount of electrical energy to be output by the primary downstream port and the secondary downstream port; and
control the power supply circuit to distribute the total power output value of electrical energy to the primary downstream port and the secondary downstream port.

2. The network bridge of claim 1, wherein the switch control logic includes at least one DIP switch, wherein a state of the at least one DIP switch selects a resistor among the plurality of discrete resistance values, and wherein the selected resistor corresponds to a PoE power class, the electronic control circuit further configured to:
determine a selected PoE power class by determining the value of the selected resistor;
determine the total power output data value based on the selected PoE power class; and
configure the power supply circuit to distribute the received electrical energy to the primary downstream port and to the secondary downstream port up to the total power output data value.

3. The network bridge of claim 1, further comprising:
a data port through which the electronic control circuit, including the microcontroller and the memory, may be programmed,
wherein the electronic control circuit is further configured to:
receive a programming via the data port;
receive the total power output data value via the programming;
select a resistor among the plurality of discrete resistance values, wherein the selected resistor corresponds to a PoE power class;
determine the total power output data value based on the selected PoE power class; and
configure the power supply circuit to distribute the received electrical energy to the primary downstream port and to the secondary downstream port up to the total power output data value.

4. The network bridge of claim 1, further comprising:
a power input connection, wherein the power supply circuit is further configured to receive electrical energy via the power input connection and to distribute the energy received via the power input connection to the network bridge and to the primary downstream port and the secondary downstream port.

5. A network system, comprising:
a process controller;
an Ethernet switch having a first port and a second port;
a network bridge, including:
a primary upstream PoE port embodied to transmit and receive data and to receive electrical energy, wherein the primary upstream PoE port is connected with the first port of the Ethernet switch;
a secondary upstream PoE port embodied to transmit and receive data and to receive electrical energy, wherein the secondary upstream PoE port is connected with the second port of the Ethernet switch;
a primary downstream port embodied to transmit and receive data via Ethernet and to transmit electrical energy;
a secondary downstream port embodied to transmit and receive data via Ethernet and to transmit electrical energy;
a power supply circuit connected to the primary upstream PoE port and to the secondary upstream PoE port and configured to receive electrical energy from the primary upstream PoE port and the secondary upstream PoE port and to distribute the received electrical energy to the network bridge, the primary downstream port, and the secondary downstream port;
a switchable resistor bank connected to the power supply circuit, wherein the switchable resistor bank includes a plurality of discrete resistance values, wherein each discrete resistance value corresponds to a PoE power class;
an Ethernet switch circuit connected to the primary upstream PoE port, the secondary upstream PoE port, the primary downstream port, and the secondary downstream port and configured to route Ethernet data between the primary upstream PoE port and the primary downstream port and to route Ethernet data between the secondary upstream PoE port and the secondary downstream port;
a switch control logic configured to switch the switchable resistor bank among the plurality of discrete resistance values; and
an electronic control circuit including a microcontroller and a memory, wherein the electronic control circuit is configured to:
configure the Ethernet switch circuit:
accept a total power output data value, wherein the total power output data value specifies the amount of electrical energy to be output by the primary downstream port and the secondary downstream port: and control the power supply circuit to distribute the total power output value of electrical energy to the primary downstream port and the secondary downstream port; and a first field device including:
  a first port embodied to transmit and receive data via Ethernet and to transmit and receive electrical energy;
  a second port embodied to transmit and receive data via Ethernet and to transmit and receive electrical energy;
  a field device power supply circuit connected to the first port and the second port and configured to receive electrical energy from the first port and to distribute the received electrical energy to the field device and to the second port;
  an Ethernet switch circuit connected to the first port and the second port and configured to route Ethernet data between the first port and the second port and further configured to route Ethernet data to the field device; and
  a field device electronics including a microcontroller and a memory, wherein the field device electronics are configured to configure the field device Ethernet switch circuit and to control the field device power supply circuit,
wherein the first field device and the network bridge are connected to each other for the transfer of Ethernet data and electrical energy by connecting the first port of the first field device with the primary downstream port of the network bridge and by connecting the second port of the first field device with the secondary downstream port of the network bridge.

6. The network system of claim 5, wherein the Ethernet switch is a PoE Ethernet switch, and wherein the PoE Ethernet switch is configured to supply electrical energy to the primary upstream PoE port and the secondary upstream PoE port.

7. The network system of claim 5, wherein the network bridge further includes a power input connection, wherein the power supply circuit is further configured to receive electrical energy via the power input connection.

8. The network system of claim 5, wherein the field device power supply circuit is further configured to receive electrical energy from the second port and to distribute the received electrical energy to the field device and to the first port.

9. The network system of claim 5, wherein the field device further includes an external power connection, and wherein the field device power supply circuit is further configured to receive electrical energy via the external power connection.

10. The network system of claim 5, further comprising:
a second field device, wherein the second port of the first field device is disconnected from the secondary downstream port and connected with the first port of the second field device, and the second port of the second field device is connected with the secondary downstream port, and
wherein the electrical energy is transferred from the primary downstream port to the first port of the first field device and from the second port of the first field device to the first port of the second field device.

11. A method of operating a network bridge, comprising:
providing a PoE power supply equipment (PSE);
providing a network bridge, including:
  a primary upstream PoE port embodied to transmit and receive data and to receive electrical energy;
  a secondary upstream PoE port embodied to transmit and receive data and to receive electrical energy;
  a primary downstream port embodied to transmit and receive data via Ethernet and to output electrical energy;
  a secondary downstream port embodied to transmit and receive data via Ethernet and to output electrical energy; and
  a switchable resistor bank including a plurality of discrete resistance values, wherein each discrete resistance value corresponds to a PoE power class,
  wherein the primary upstream port and the secondary upstream port of the network bridge are electrically connected to the PSE;
providing a first field device, the first field device including:
  a first port embodied to transmit and receive data via Ethernet and to transmit and receive electrical energy; and
  a second port embodied to transmit and receive data via Ethernet and to transmit and receive electrical energy,
  wherein the first port of the first field device is connected to the primary downstream port of the network bridge;
determining a total power requirement, wherein the total power requirement includes electrical power necessary to operate the network bridge and the first field device;
determining a PoE power class having a power rating greater than the total power requirement;
configuring the switchable resistor bank to a resistance value corresponding to the determined PoE power class;
determining the PoE power class of the network bridge by the connected PSE measuring the resistance value of the switchable resistor bank;
supplying electrical energy from the PSE to the network bridge according to the PoE power class;
supplying electrical energy from the primary downstream port of the network bridge to the first port of the first field device; and
communicating Ethernet data from the primary downstream port of the network bridge to the first port of the first field device.

12. The method of claim 11, further comprising:
providing a second field device wherein the first port of the second field device is connected to the second port of the first field device, and the second port of the second field device is connected to the secondary downstream port of the network bridge, thereby forming a daisy-chain network;
supplying electrical energy from the second port of the first field device to the first port of the second field device;
communicating the Ethernet data from the second port of the first field device to the first port of the second field device; and
communicating the Ethernet data from second port of the second field device to the secondary downstream port of the network bridge,
wherein the total power requirement further includes electrical power necessary to operate the second field device.

13. The method of claim 11, further comprising:
testing at the network bridge the Ethernet traffic at the primary downstream port and the secondary downstream port, wherein the testing is configured to detect a failure in the daisy-chain network;

when the tested Ethernet traffic indicates a failure in the daisy-chain network, the method further comprises:
  communicating Ethernet data from the secondary downstream port of the network bridge to the second port of the second field device; and
  communicating the Ethernet data from the first port of the second field device to the second port of the first field device.

14. The method of claim 12, wherein, upon a network or a device failure, the method further comprises:
  supplying electrical energy form the secondary downstream port of the network bridge to the second port of the second field device.

* * * * *